United States Patent [19]

Henneberg

[11] Patent Number: 4,624,433
[45] Date of Patent: Nov. 25, 1986

[54] TILT BASE FOR A CRT DISPLAY TERMINAL

[75] Inventor: Helmut H. Henneberg, Canton, Mass.

[73] Assignee: Honeywell Information Systems Inc., Waltham, Mass.

[21] Appl. No.: 531,803

[22] Filed: Sep. 13, 1983

[51] Int. Cl.[4] .......................................... F16M 13/00
[52] U.S. Cl. .................................. 248/346; 248/456; 248/359
[58] Field of Search ............... 248/359, 457, 455, 456, 248/300, 346, 678, 359 R, 359 G, 459, 460, 371, 397, 454, 676, 680, 681, 664, DIG. 1A, DIG. 1B, DIG. 1C, DIG. 1E–DIG. 1J

[56] References Cited

U.S. PATENT DOCUMENTS

| | | | |
|---|---|---|---|
| D. 164,483 | 9/1951 | Flannery | D19/91 |
| D. 244,331 | 5/1977 | Woods | D19/91 |
| 1,508,326 | 9/1924 | Hensley | 248/681 |
| 1,758,646 | 5/1930 | Brown | 248/681 |
| 1,765,727 | 6/1930 | Kurowski | 248/680 |
| 1,821,060 | 9/1931 | Issacson | 248/455 |
| 1,923,351 | 8/1933 | Woodley | 248/456 |
| 1,953,527 | 6/1934 | Bentley | 248/456 |
| 2,219,091 | 10/1940 | Henderson | 248/456 |
| 2,792,668 | 5/1957 | Gallamos | 248/456 |
| 3,991,967 | 11/1976 | Sack | 248/456 |
| 4,174,821 | 11/1979 | Levine | 248/300 |

FOREIGN PATENT DOCUMENTS 3882 of 1906 United Kingdom ................ 248/456

OTHER PUBLICATIONS

Three Sheets of Drawings–Sheet Dwg. No. 60134965, title Support Assy; Sheet Dwg. No. 60135012, title CRT Support Assy, and Sheet Dwg. No. 60134965, title Support Assy.

Primary Examiner—Ramon S. Britts
Assistant Examiner—A. Chin-Shue
Attorney, Agent, or Firm—Faith F. Driscoll; John S. Solakian

[57] ABSTRACT

A tilt base assembly includes a top plate, a horizontal base plate and a stabilizing flap which are joined together to form a pivoting wedge-shaped structure. The top plate is attachable to the bottom or base of a cathode ray tube (CRT) display terminal unit. The base plate includes a series of stops into which a free end of the stabilizing flap can be positioned after following free under the force of gravity when the terminal unit is rotated forward.

42 Claims, 12 Drawing Figures

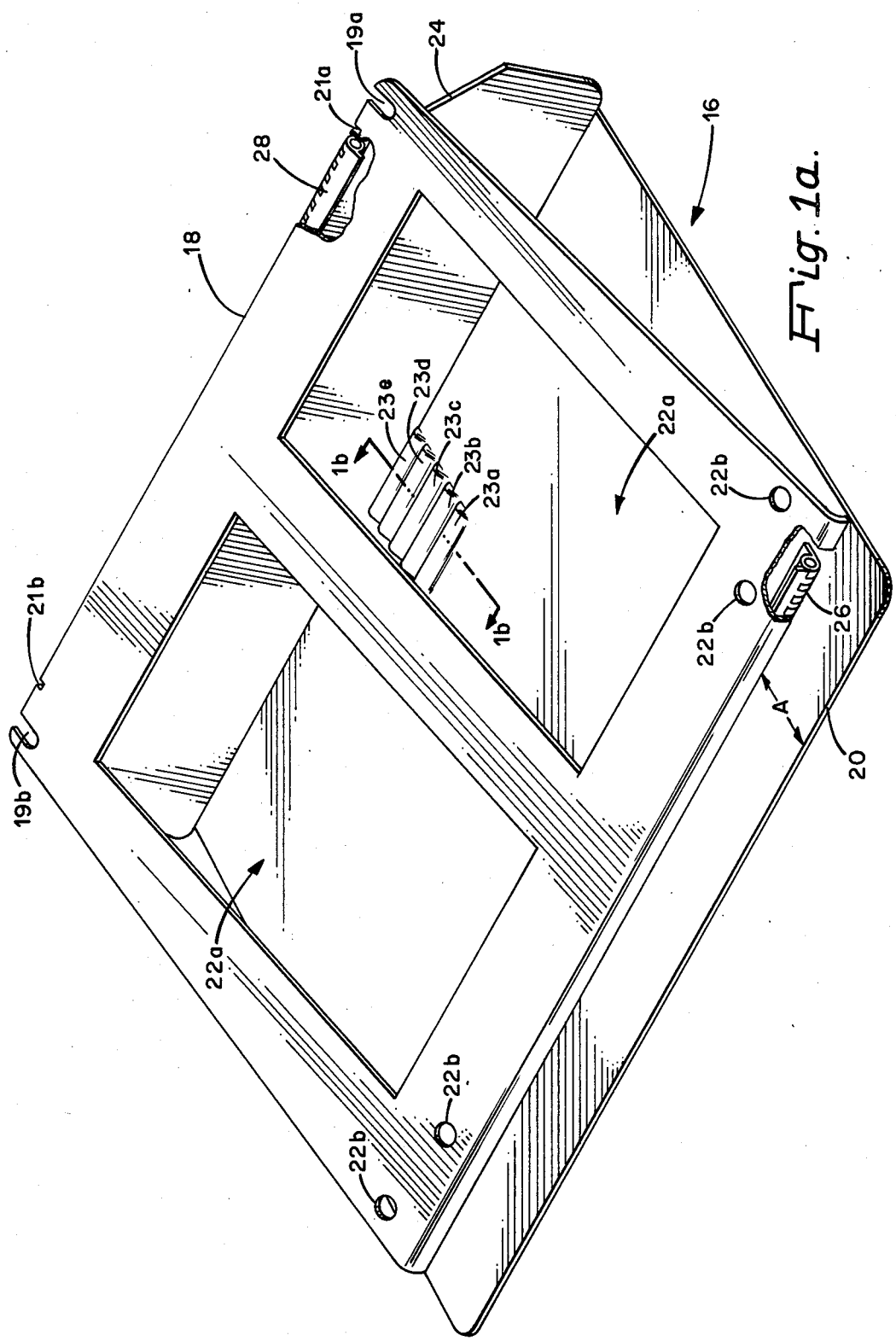

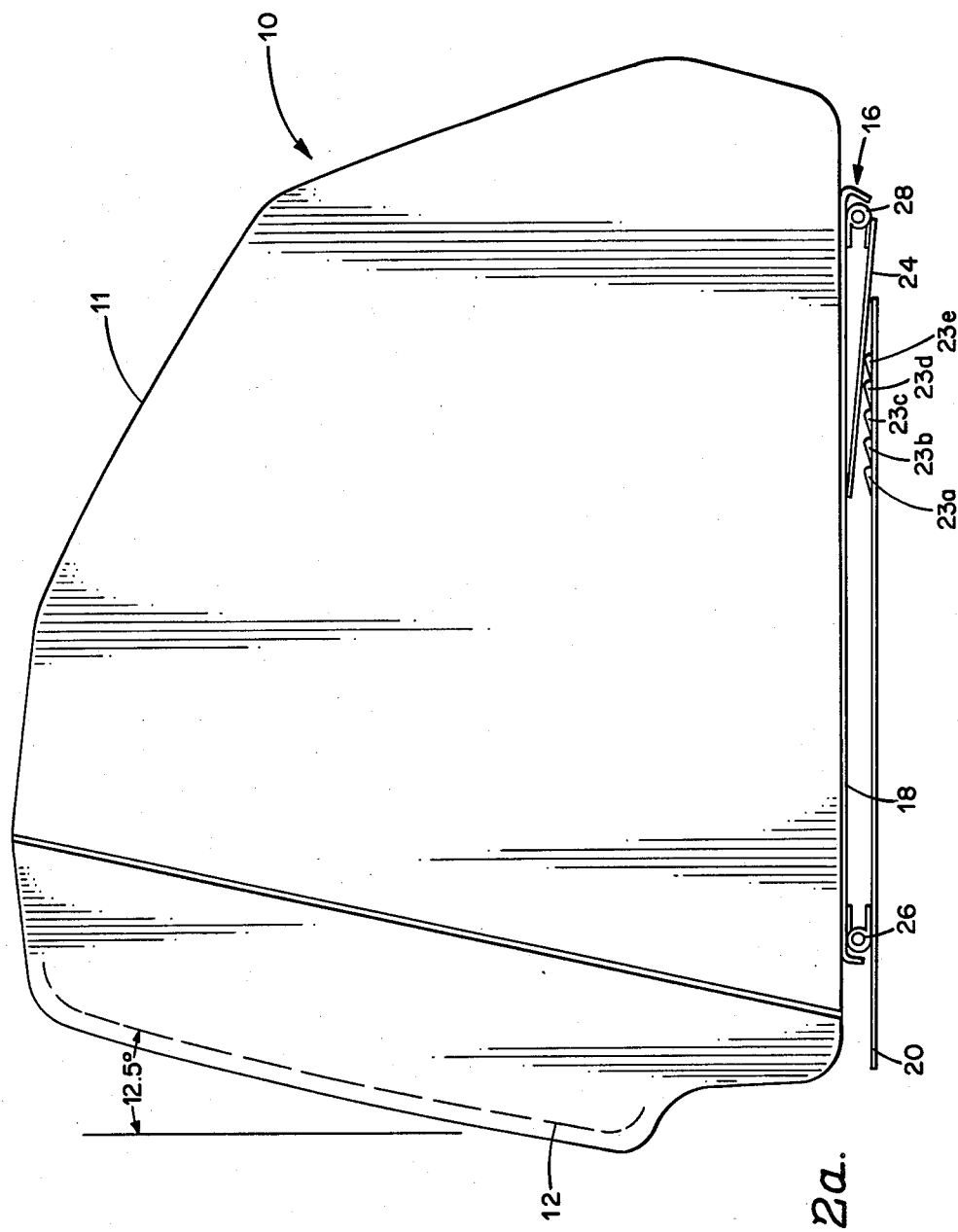

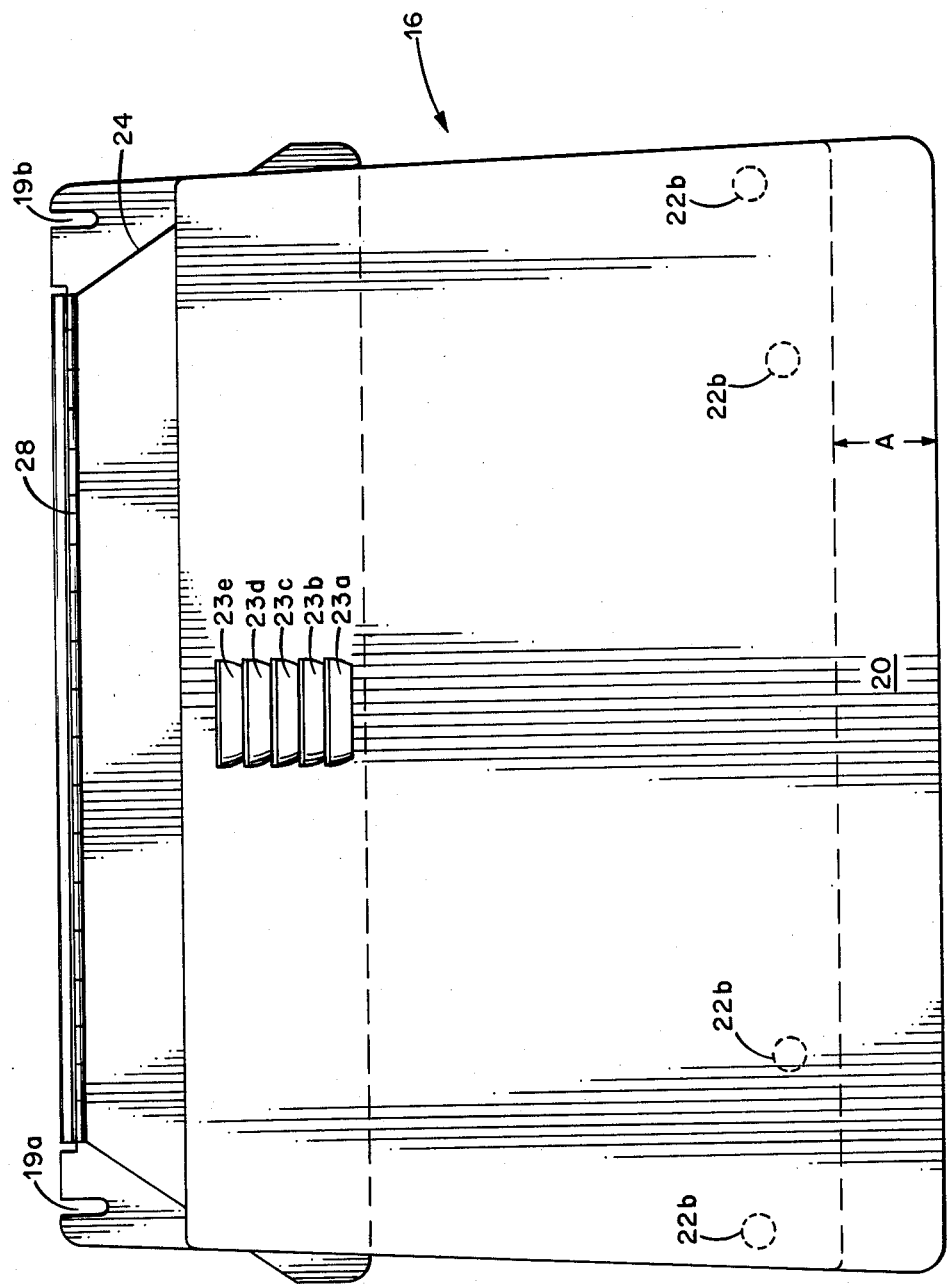

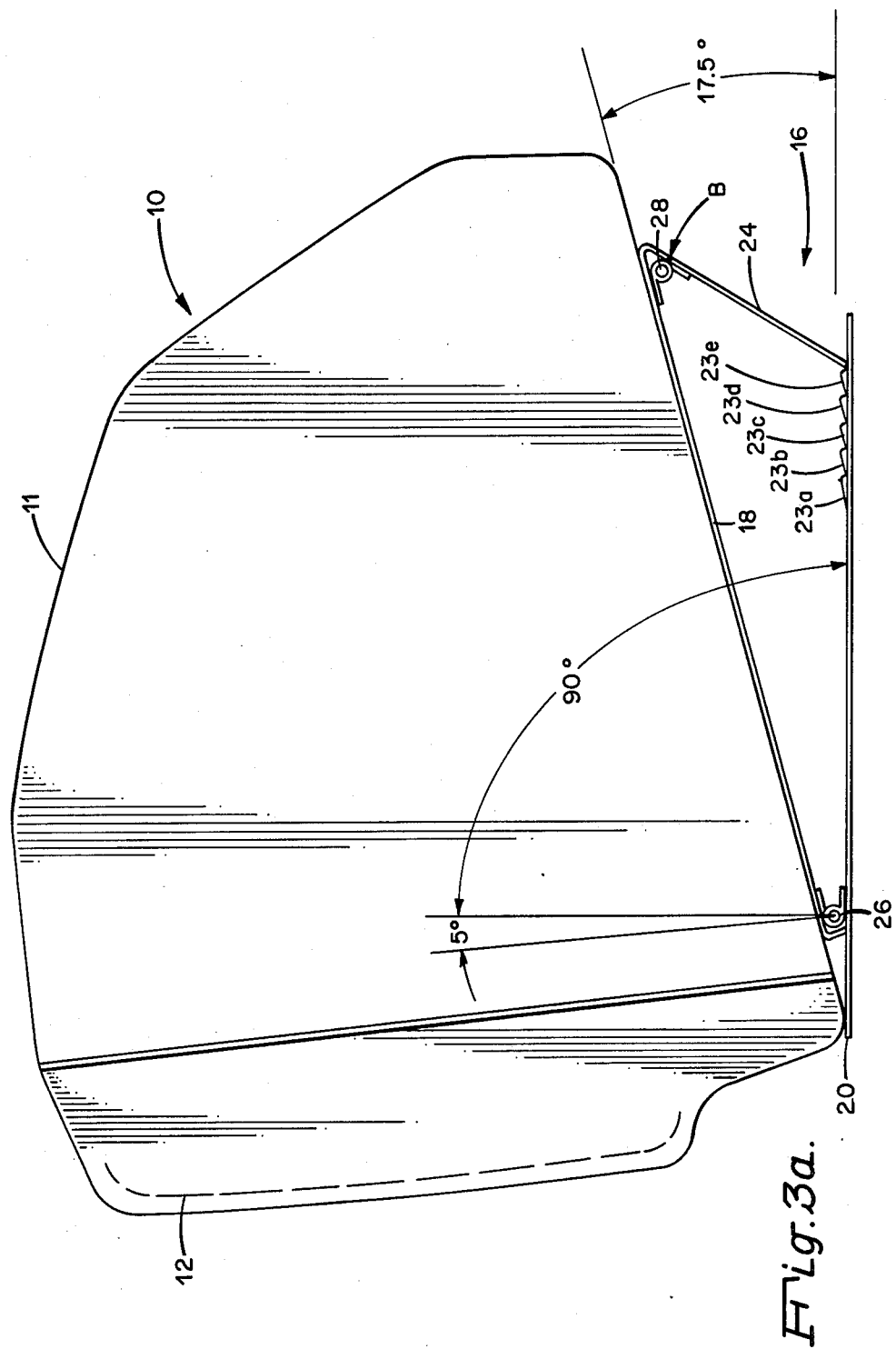

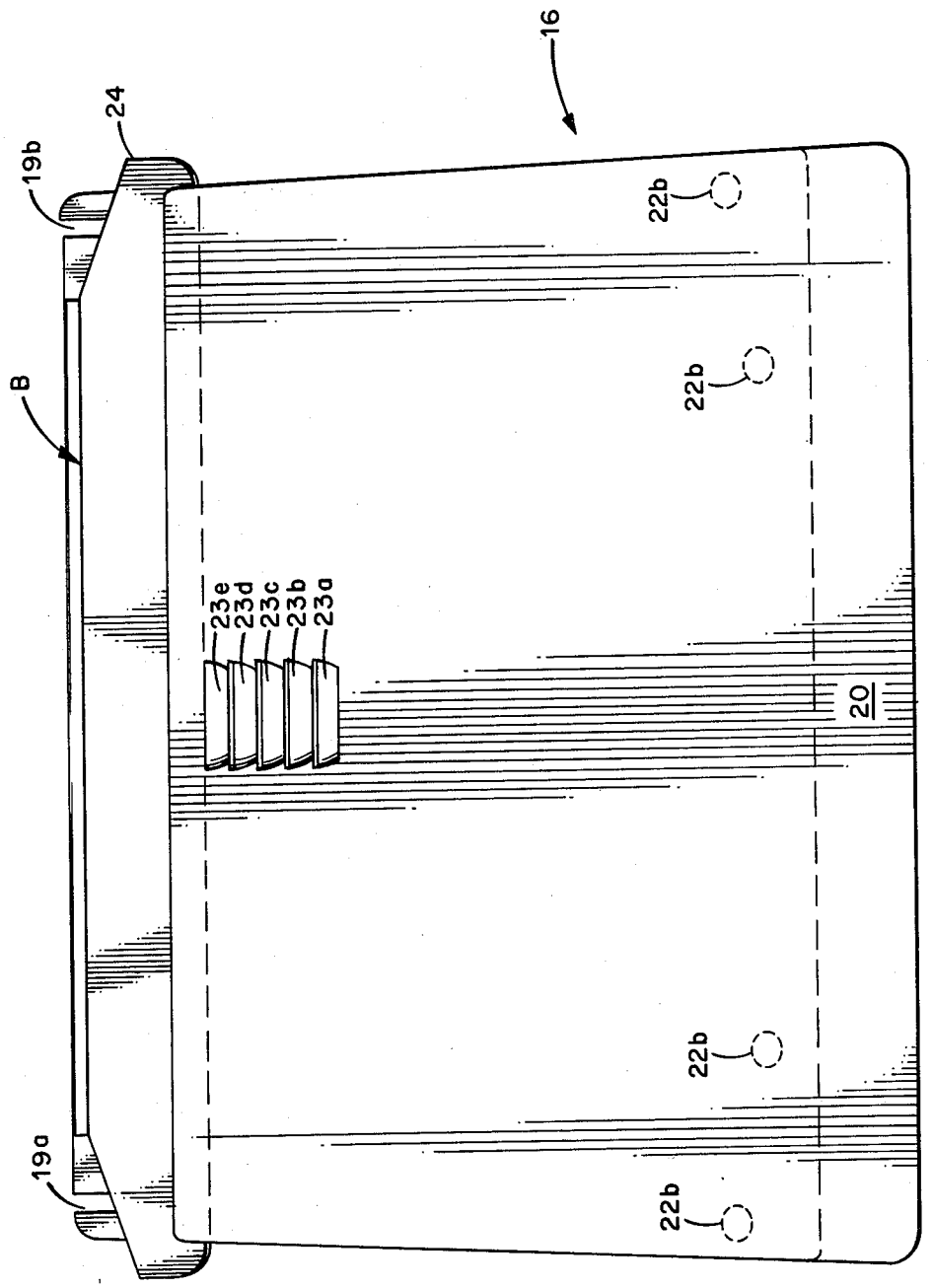

TILT BASE FOR A CRT DISPLAY TERMINAL

BACKGROUND OF THE INVENTION

1. Field of Use

The present invention relates to positioning apparatus and more particularly to base support apparatus for adjusting the degree of tilt of the screen of a cathode ray tube display terminal device.

2. Prior Art

There has been a significant increase in the frequency of use of cathode ray tube (CRT) display terminal devices. Therefore, it becomes more esential to make such devices more convenient and comfortable for an operator to use.

One problem encountered by operators concerns the amount and angle of incident light which falls on the screen surface of the CRT display device and produces reflections making it impossible in some instances for an operator to view information being displayed on the screen. Normally, the amount of incident light varies with the time of day and the placement or positioning of the CRT device on the operator's work space. In view of this, it becomes very desirable for an operator to be able to alter the viewing angle of the CRT's screen surface so as to minimize or eliminate reflections.

Some prior art CRT display devices have the tilt mechanism built into the device. That is, the CRT tube casing or housing is mounted on pivotal support base structures which permit the tube screen to be tilted by the operator.

This type of arrangement has been found to introduce additional problems in constructing a suitable plastic housing or casing structure for the device. Also, it becomes difficult to provide a tilt mechanism sturdy enough to meet stringent shock and vibration test requirements.

Another prior art CRT display device uses a chassis which is pivotally mounted on a frame by two pivot pins. The viewing angle is adjusted by pivoting the chassis about the pivot pins. An example of this type of arrangment is disclosed in IBM Technical Disclosure Bulletin "Adjustable Mount for CRT Terminal", Vol. 21, No. 3, August 1978. These types of arrangements also have been found to require complex construction which results in increase in costs.

To reduce costs, other prior art arrangements have utilized free standing tilt mechanisms. One such unit is described in U.S. Pat. No. 4,368,867. Another such unit has a three piece construction which includes a base plate, a top plate and an adjustable flap. The flap is hinged to the base plate and can be latched into a series of slots on the top plate by means of a spring biased arrangement.

The first arrangement has the disadvantage of requiring some amount of assembly prior to use with a CRT terminal unit. The second arrangement requires that the top plate on which the CRT terminal unit rests must be lifted by an operator and the flap latched into the desired slot. This has been found to introduce difficulties in operator adjustments.

Accordingly, it is a primary object of the present invention to provide CRT terminal base support for adjustment of the CRT screen viewing angle which is inexpensive to construct.

It is a further object of the present invention to provide a tiltable base support which provides a wide range of CRT screen viewing angle adjustment without requiring two hands.

SUMMARY OF THE INVENTION

The above objects of the present invention are achieved in a preferred embodiment of the present invention which comprises a tilt base assembly which includes a top plate, a horizontal base plate and a stabilizing flap joined together to form a pivoting wedge-shaped structure. The front of the wedge-shaped structure is formed by hinging together or pivotally mounting the front of the top plate at a position on the horizontal base plate. The position is located at a predetermined distance from the front edge of the base plate. The portion of the base plate which extends outward from the hinged point of connection functions as a stabilizer. That is, it prevents the CRT terminal unit from falling face down as it is being moved or pulled forward by an operator during tilt angle adjustment.

The back of the wedge is formed by hinging together or pivotally mounting the stabilizing flap to the back of the top plate so that the flap swings freely. The top plate attaches to the bottom or base housing of the CRT display terminal unit through slots which are secured with screws located at the rear of the terminal unit's base housing. The top plate slots are located at the rear of the plate so that the CRT terminal unit cannot slip off the top plate when moved forward during adjustment. The top and base plates are tapered to conform to the shape of the base housing.

Both ends of the top plate are flanged to conceal the otherwise exposed hinged portions. The flange on the back end also abuts up against the flap when the tilt mechanism is positioned for maximum tilt angle. Thus, the flange limits the maximum travel of the flap thereby performing self-checking function of prohibiting an operator from overriding of a series of stops incorporated into the base plate, thus ensuring the safe elevation of the terminal unit.

The flap is shaped so that its sides extend beyond the side edges of the top plate. This considerably enhances adjustment by providing finger gripping surfaces or tabs for operator when adjusting the flap by rotation through the base plate stops. The stops correspond to a series of equally spaced ramps or protrusions located on the top surface of the base plate. The dimensions of each ramp stop are selected to provide an equal increment of tilt angle, allow ease of positioning and secure placement of the flap. In the preferred embodiment, the stops are made by punching through the base plate so as to form or create a corresponding number of small louvers.

In the preferred embodiment, the entire tilt mechanism is of metal construction. This provides the requisite stability and low cost. Additionally, the metal eliminates any thermal problems, since it acts as a heat sink in transferring heat away from the normally convection cooled CRT terminal unit.

The tilt base assembly of the preferred embodiment provides a wide range of adjustment from 12.5° to 5° past vertical in five equal increments or steps. When not in use, the tilt base assembly can be placed in a fully collapsed position at which time the top and base plates are parallel to each other. This gives the assembly a low profile.

According to the teachings of the present invention, the wedge-shaped tilt base assembly is designed to be gravity operated. That is, as the CRT terminal unit is rotated in a forward direction, the stabilizing flap falls freely or rotates downward adding to the space at the rear of the wedge-shaped tilt base assembly.

To adjust the CRT terminal unit, the operator pulls forward on the top of the terminal unit enclosure or lifts the unit at the side near the rear allowing the stabilizing flap to drop into a first stop position. As the operator continues to rotate the terminal unit forward, the flap can be easily moved through successive stop positions until the desired angle of tilt is reached. To decrease the tilt angle or fully collapse the wedge-shaped tilt base assembly, the operator again rotates the terminal unit forward and releases the flap by its extended sides or tabs. By continuing to move the flap upward, the tilt base assembly continues to collapse lowering the terminal unit until the assembly is placed in fully collapsed position.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

BRIEF DESCRIPTION OF THE DRAWINGS

FIG. 1 is a perspective view of a preferred embodiment of the tilt base assembly of the present invention which is partially cut away to show its internal construction.

FIGS. 1b and 1c show in greater detail, the system of stops of the preferred embodiment of FIG. 1a.

FIGS. 2a through 2c are side, top and bottom views of the tilt base assembly of FIG. 1a when fully collapsed as utilized with a cathode ray tube (CRT) display terminal unit.

FIGS. 3a through 3c are side, top and bottom views of the tilt base assembly of FIG. 1a when extended to provide maximum tilt angle.

DESCRIPTION OF THE PREFERRED EMBODIMENT

Figure 1B:
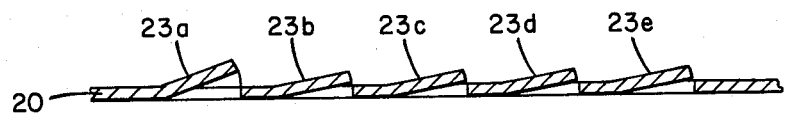

FIG. 1 depicts a perspective view of a preferred embodiment of the tilt base assembly 16 of the present invention. The assembly 16 is designed for use with a cathode ray tube (CRT) display terminal unit 10 illustrated herein which may take the form of the fifteen-inch CRT display terminal unit designated as the VIP7200 manufactured by Honeywell Information Systems Inc. The terminal unit 10 weighs approximately ten (10) pounds making it relatively easy to position as explained herein.

As seen from FIG. 1a, the tilt base assembly 16 includes a base plate 20, a top plate 18 and a stabilizing flap 24 which are joined together by a pair of continuous hinges 26 and 28 to form a gravity operated pivoting wedge shaped assembly. Both continuous hinges 26 and 28 are conventional in design. For example, they may take the form of continuous hinges manufactured by Stanley Corporation which are identified as cold rolled steel 1½" open×0.045 thick with an 0.089 pin diameter.

As seen from the FIG. 1a, hinge 26 forms the front of the wedge shaped assembly 16 and is positioned a predetermined distance in from the front edge of base plate 20. More particularly, the flange portions of hinge 26 are welded to the bottom side of top plate 18 and top surface of base plate 20 as seen in FIG. 2a. The outer portion of base plate 20 denoted by the letter "A" functions as a stabilizer or outrigger. That is, it prevents the CRT terminal unit 10 mounted to top plate 18 from falling face down during tilt angle adjustment.

Base plate 20 is somewhat rectangular in shape and rests on the work surface. As shown, base plate 20 contains a series of stops 23a through 23e used for adjusting tilt angle as explained herein. As seen from FIG. 1a, continuous hinge 28 forms the back of wedge shaped assembly 16 by joining together the back of top plate 18 and one end of flap 24. More particularly, the flange portions of hinge 28 are welded to the bottom side of top plate 18 and the inside surface of flap 24 as seen in FIG. 2a. The hinged connection permits flap 24 to swing freely as discussed herein.

The top plate 18 is somewhat rectangular like in shape with the exception that the sides of plate 18 are tapered to be slightly wider at the front than the back so as to conform to the shape of the bottom of the terminal unit 10 when mounted thereon.

The top plate 18 attaches to the bottom of the terminal unit 10 through a pair of slots 19a and 19b. Any feet which form a part of the terminal unit pass through appropriately positioned circular cutaways in the top plate 18. These cutaways are designated as 22b in FIG. 1a. The slots are secured with screws located at the rear of the terminal unit's base pan or bottom. The slots 19a and 19b are so located at the rear so that the terminal unit 10 cannot slip off the plate 18 when the unit is being moved forward during adjustment.

Both ends of top plate 18 are flanged concealing hinges 26 and 28. The rear edge of plate 18 extending from indentations 21a to 21b has a flange which projects downward to a point where it abuts against flap 24 when assembly has been positioned for maximum tilt angle as shown in FIG. 3a. In this way, the rear flange limits the maximum travel of flap 24 by prohibiting an operator from overriding of the series of stops 23a through 23e incorporated into base plate 20. This ensures the safe elevation of terminal unit 10. Additionally, top plate 18 contains two rectangular cutouts 22a. The cutouts 22a facilitate cooling of the normally convection cooled terminal unit 10.

The flap 24 is shaped so that its sides extend beyond the side edges of top plate 18. That is, its rudder-like shape considerably enhances adjustment by providing finger gripping surfaces or tabs by which an operator can move or rotate flap 24 through during tilt adjustment.

The entire tilt assembly of FIG. 1a is constructed from #18 (0.048) cold roll steel material. This provides the requisite stability and low cost. Additionally, the steel material functions as a heat sink by transferring away any heat generated by the terminal unit 10.

Figure 1C:
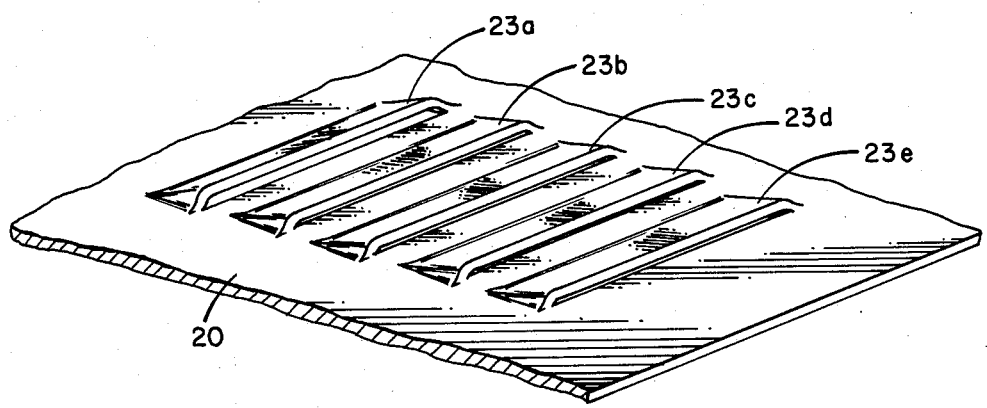

FIG. 1b shows a cross section of the series of louver stops 23a through 23e shown in greater detail in FIG. 1c which forms a part of base plate 20. According to the present invention, the stops consist of five (5) equally spaced ramps or protrusions. The dimensions of each ramp stop are selected to provide an equal increment of tilt angle which approximates one-fifth of the total range of tilt adjustment. In the preferred embodiment, the tilt angle adjustment is from 12.5° to 5° past vertical.

As seen from FIG. 1c, the stops 23a through 23e are made by punching through base plate 20 so as to form or produce a corresponding number of small louvers. The punching operation is carried out in a single step using a die containing impressions of all five stops. The louvers are closed at each end to prevent flap 24 from jamming or sticking during adjustment. Additionally, the louvers are shaped so that there are no sharp edges or corners which could cause injury to an operator.

To ensure stability, when the terminal unit 10 is placed at a first increment of tilt angle which corresponds to a tilt angle of approximately 3°, ramp stop 23a is constructed to have a slightly larger angle or slope. This holds flap 24 in place with an added degree of security when a minimum adjustment is selected. The height and width dimensions of the ramp stops 23a through 23e are selected to minimize cost of construction (e.g. tooling and tolerances) and surface wear of the base plate 20. By minimizing the amount of contact between flap 24 and base plate 20, friction is reduced to a minimum thereby providing ease of adjustment and alignment.

FIG. 2a is a side view of CRT display terminal unit 10 and tilt base assembly 16. The Figure illustrates the low profile of the CRT terminal unit 10 when the assembly 16 has been placed in a completely collapsed or folded position when not in use. As seen from the Figure, the face 12 of the CRT terminal unit 10 provides a normal viewing angle without tilt adjustment.

Figure 2B:
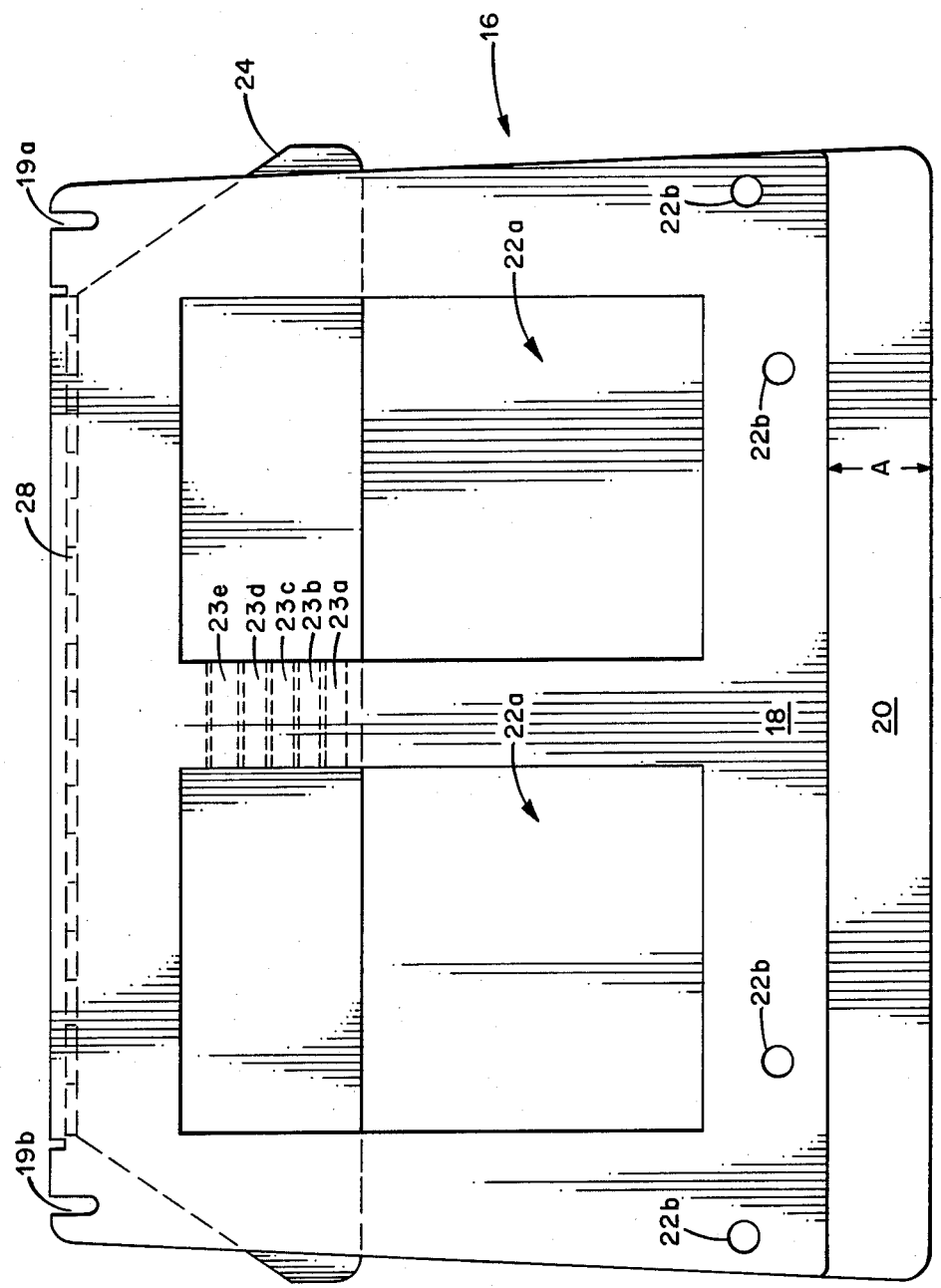

FIGS. 2b and 2c show top and bottom views of the tilt base assembly 16 when placed in the completely collapsed or folded position. Both Figures illustrate how the left and right tabs of flap 24 extend outward from the sides of top plate 18 facilitating adjustment. They also show the tapered sides of top plate 18 and base plate 20. Also, FIG. 2c shows in greater detail, continuous hinge 28 and stops 23a through 23e.

FIG. 3a is another side view of CRT display terminal unit 10 and tilt base assembly 16. This Figure illustrates the relative positioning of unit 10 and tilt base assembly 16 when assembly 16 has been adjusted for maximum tilt angle positioning flap 24 at stop 23e. As seen from the Figure, the face 12 of unit 10 is positioned at an angle of 12.5°. It will be noted from the view, how the flange of top plate 18 securely holds flap 24 in place of point B. Unless extreme force sufficient to bend flap 24 is applied, flap 24 will be securely held in place.

Figure 3B:
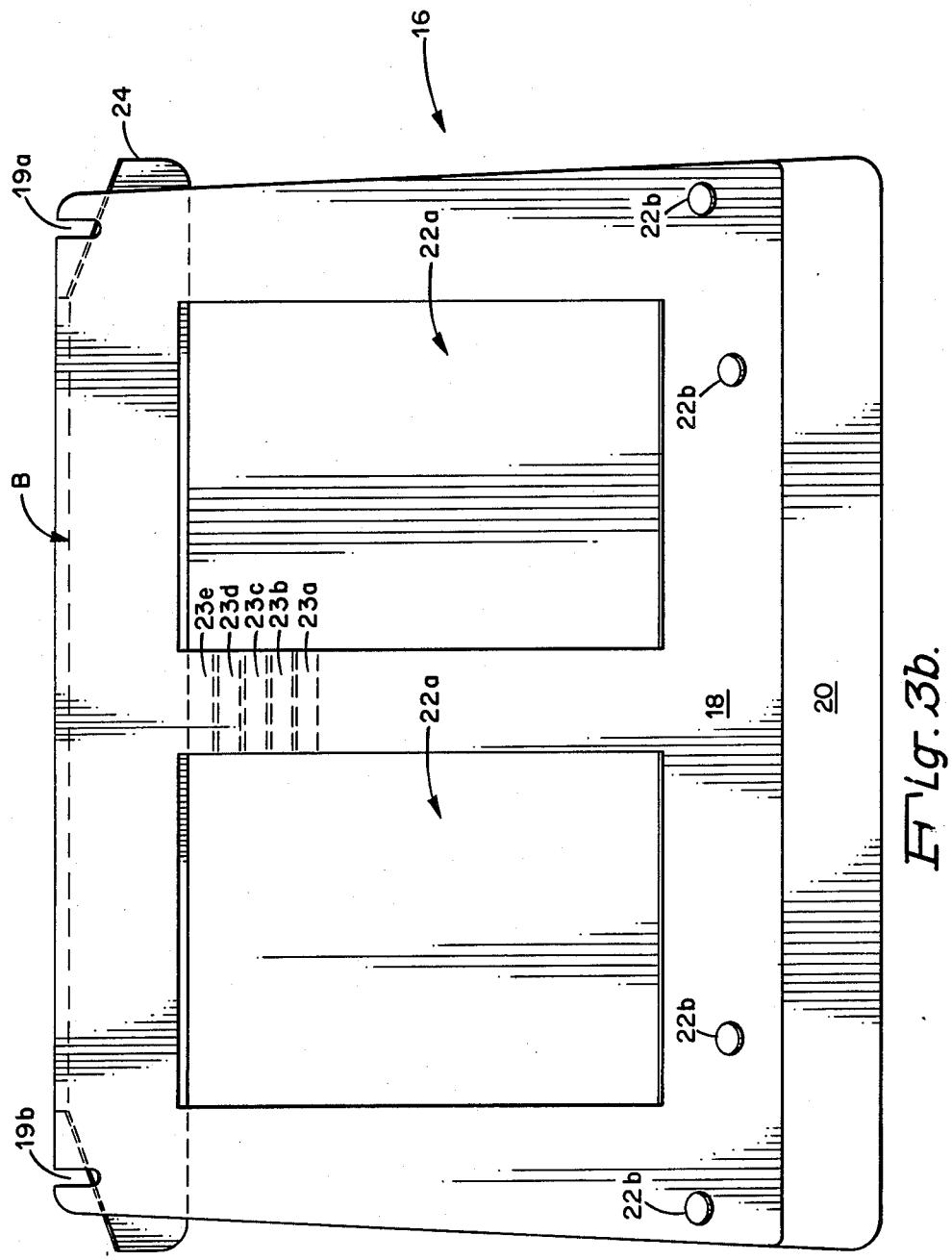

FIGS. 3b and 3c show other top and bottom views of the tilt base assembly 16 when adjusted for maximum tilt angle. Again, both Figures illustrate how the left and right tabs of flap 24 extend outward from the sides of top plate 18 facilitating tilt angle adjustment.

Figure 4:
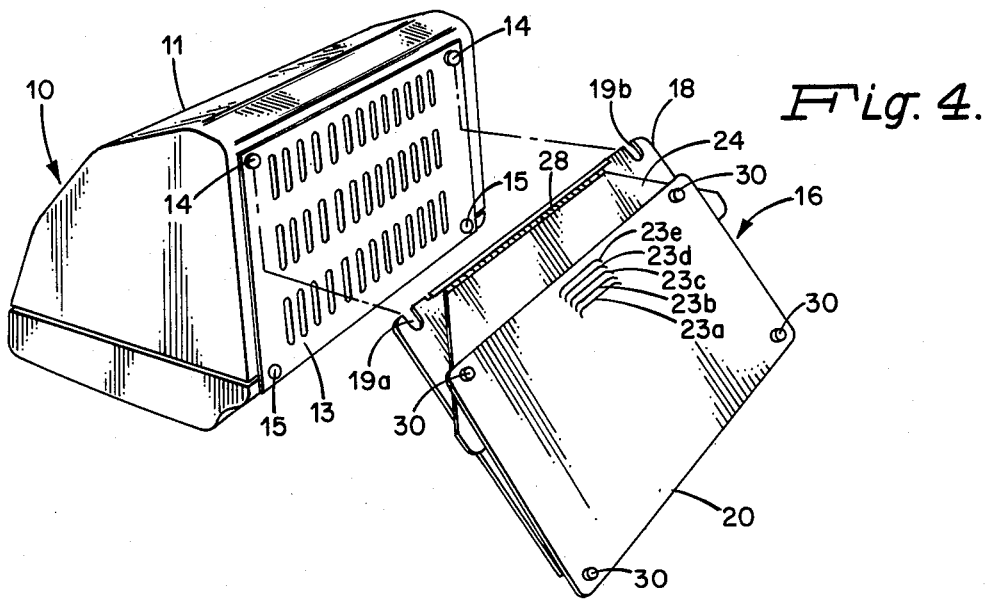
FIG. 4 is a perspective view of the tilt base assembly of FIG. 1 and CRT display terminal unit illustrating the instruction.

FIG. 4 shows how the tilt base assembly can be attached to the bottom or base housing 13 of CRT terminal unit 10. As seen from the Figure, the base housing 13 includes a series of slots which form a vent pattern for providing convection cooling.

The assembly 16 is easily installed and held in position by two screws 14a and 14b located at the rear of the terminal unit base housing 13. As shown, the operator or user places the terminal unit's tube 12 face down. Next, the operator loosens the top most mounting screws 14 at the corners of the base housing 13.

The top plate 18 of the fully collapsed or folded assembly 16 is positioned so that the slots 19a and 19b slide into place and the unit's feet 15 pass through corresponding ones of the circular cutouts 22b of top plate 18. Now, the mounting screws 14 need only be retightened which locks the assembly 16 in place. As required, the user can attach skid resistent rubber feet 30 at each corner of the base plate 20 of assembly 16. The operator places the terminal unit 10 in an upright position by rotating same at which time the unit 10 is ready for use.

DESCRIPTION OF OPERATION

Figure 5A:
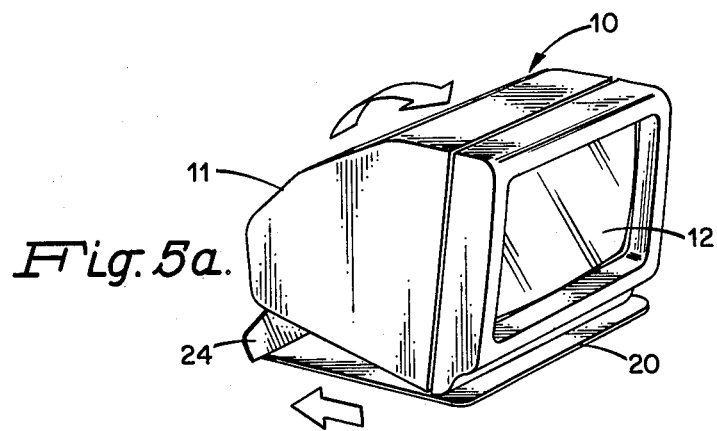
FIGS. 5a and 5b are perspective views of the tilt base assembly of FIG. 1 and the CRT display terminal unit illustrating adjustment of tilt angle.
Figure 5B:
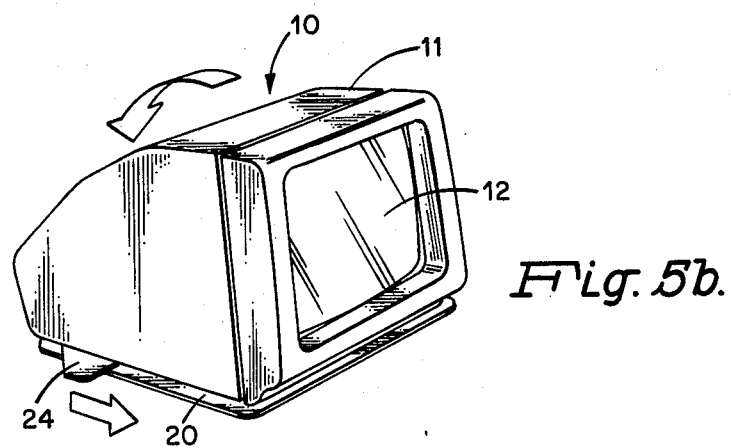

FIGS. 5a and 5b show how an operator or user is able to adjust the tilt angle of the face 12 of the terminal unit 10 as a function of the amount of incident light falling thereon. As discussed above, the assembly 16 operates on a gravity principle. That is, to adjust the tilt angle, the user or operator rotates terminal unit 10 forward as shown in FIG. 5a. This is done by pulling on the top of enclosure 11 or by lifting the enclosure 11 at the side rear. By so doing, the stabilizing flap 24 automatically falls free and drops into the first ramp stop 23a. As the user continues to rotate the terminal unit 10, the flap 24 continues to move through successive stops 23b through 23e until the desired tilt angle is obtained or until flap 24 is fully extended as illustrated by FIG. 5a.

To decrease the tilt angle or fully collapse the assembly 16, the user again rotates the terminal unit 10 forward as shown in FIG. 5b. The flap 24 is easily disengaged using the left and right tabs of flap 24. By moving the flap 24 in the direction shown, the tilt angle can be decreased as required by gently lowering terminal unit 10. In the same manner, the tilt base assembly 16 can be placed in a fully collapsed position as the unit 10 is gently lowered.

The above has illustrated a tilt base assembly which is very economical to construct, easy to install and very easy to adjust to changes in an operator work environment. As mentioned, the assembly when fully collapsed, fits under the CRT terminal unit and does not add to the height of the terminal unit eliminating any inconvenience to the operator. The construction of the assembly ensures stability as well as aiding in the cooling of the convection cooled CRT display terminal unit.

It will be appreciated by those skilled in the art that changes may be made to the preferred embodiment of the present invention to accommodate terminal units of different construction. For example, the dimensions of the tilt base assembly parts may be increased or decreased in conformance with the terminal unit's shape.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A wedge-shaped tilt base assembly for use with a CRT display terminal unit for providing a wide range of operator viewing angles, said assembly comprising:
   top plate means having front and rear edges defining a shape which conforms to the shape of the bottom of said unit;
   base plate means having front and rear edges which define a shape similar to said shape of said top plate means; and, stabilizing flap means having a predetermined shape; one end of said top plate means being pivotally mounted to said base plate at a predetermined position away from said front edge of said base plate means for stabilizing said terminal unit and to form top and bottom portions of said wedged-shaped assembly and the other end of said top plate means being pivotally mounted to one end of said flap means which forms a rear portion of said wedge-shaped assembly, the other end of said flap means being allowed to swing free as said top plate means is rotated through said viewing angles;

said top plate means including at least a pair of open ended slots, one at each corner at said rear edge of said top plate for the attachment of said assembly to said terminal unit; and said base plate means including a series of stops corresponding to a series of louvers, each of said louver having a front to rear slope to enable rearward sliding of said free end of said flap means to be slid securely into position by an operator without separately lifting said terminal unit during the rotation of said top plate means to provide a corresponding number of different viewing angles for said terminal unit.

2. The assembly of claim 1 wherein said predetermined shape of said flap means is rudder-like so as to have tab portions which extend outward beyond the sides of said top plate means for facilitating tilt adjustment.

3. The assembly of claim 1 wherein said assembly further includes:
a first continuous hinge member means having a pair of flanges, one flange being attached to the bottom of said top plate means near said front edge and the other flange being attached to the top of said base plate means at said predetermined position for enabling said top plate means to pivot; and,
a second continuous hinge member means having a pair of flanges, one flange being attached to said bottom of said top plate near said rear edge and the other flange being attached to inside of said flap means near the top edge for enabling said flap means to swing freely when said top plate means is rotated.

4. The assembly of claim 3 wherein said front and rear edges of said top plate means are flanged so as to conceal said first and second hinge member means which enable the pivoting of said top plate means and said flap means.

5. The assembly of claim 1 wherein said rear edge of said top plate means is flanged so as to extend in a downward direction a predetermined distance for establishing a maximum limit of travel of said flap means.

6. The assembly of claim 3 wherein the sides of said top plate means are tapered to conform to said shape of said bottom of said terminal unit.

7. The assembly of claim 6 wherein said top plate means includes a pair of substantially rectangular shaped cutout portions for aiding in the cooling of said terminal unit.

8. The assembly of claim 6 wherein said top plate means includes a pair of substantially rectangular shaped cutout portions for aiding in the cooling of said terminal unit.

9. The assembly of claim 3 wherein said top plate means, said base plate means and said flap means are constructed of cold rolled steel material.

10. The assembly of claim 1 wherein each of said series of louvers has a predetermined width and height.

11. The assembly of claim 10 wherein said height of a first one of said series of louvers is greater than the height of the remaining ones of said series of louvers so as to provide additional stability when said flap means is positioned at said first one of said louvers corresponding to a minimum selectable angle of tilt.

12. The assembly of claim 10 wherein said series of louvers are equally spaced from each other so as to provide a corresponding number of viewing angle positions of the same increment within said range.

13. The assembly of claim 12 wherein said number is five and said range corresponds to at least 17.5 degrees.

14. The assembly of claim 10 wherein said width of said series of louvers is selected to reduce friction and wear of said base plate means for ease of adjustment and alignment.

15. The assembly of claim 11 wherein each of said remaining ones of said series of louvers is closed at each end so as to ensure freedom of movement of said flap means during adjustment.

16. A tilt base assembly attachable to the bottom of a CRT display terminal unit for supporting said unit and for providing a wide range of operator viewing angles, said assembly comprising:
top plate means having a predetermined shape which conforms to the shape of said bottom of said terminal unit, said top plate means including at least a pair of open ended slots, one located at each rear corner for attaching said top plate means to said bottom of said terminal unit;
base plate means having front and rear edges which define said predetermined shape, said base plate means including a series of stops corresponding to a series of louvers, each of said louver having a front to rear slope, for providing said wide range of viewing angles and for securely positioning said terminal unit;
stabilizing flap means having a predetermined shape;
first mounting means for pivotally mounting one end of said top plate to said base plate means at a predetermined point from said front edge of said base plate means for stabilizing said terminal unit and to form the top and bottom sections of a wedge; and,
second mounting means for pivotally mounting the rear edge of said top plate means to one end of said flap means so that said flap means forms a rear section of said wedge and has its other end under the force of gravity swing free when said terminal unit is rotated forward by an operator without lifting said terminal unit by rearwardly sliding said free end of said flap means through said series of sloped lovuers providing different tilt viewing angles within said wide range.

17. The assembly of claim 16 wherein said predetermined shape of said flap means is rudder-like so as to have tab portions which extend outward beyond the sides of said top plate means for facilitating tilt adjustment.

18. The assembly of claim 16 wherein said first mounting means includes:
a first continuous hinge member having a pair of flanges, one flange being attached to the bottom of said top plate means near said front edge and the other flange being attached to the top of said base plate means at said predetermined position for enabling said top plate means to pivot; and, wherein said second mounting means includes a second continuous hinge member having a pair of flanges, one flange being attached to said bottom of said top plate near said rear edge and the other flange being attached to inside of said flap means near the top edge for enabling said flap means to swing freely when said top plate means is rotated.

19. The assembly of claim 18 wherein said front and rear edges of said top plate means are flanged so as to conceal said first and second hinge members which enable the pivoting of said top plate means and said flap means.

20. The assembly of claim 19 wherein said rear edge of said top plate means is flanged so as to extend in a downward direction a predetermined distance for establishing a maximum limit of travel of said flap means.

21. The assembly of claim 18 wherein the sides of said top plate means are tapered to conform to said shape of said bottom of said terminal unit.

22. The assembly of claim 18 wherein said top plate means, said base plate means and said flap means are constructed of cold rolled steel material.

23. The assembly of claim 16 wherein each of said series of louvers has a predetermined width and height.

24. The assembly of claim 23 wherein said height of a first one of said series of louvers is greater than the height of the remaining ones of said series of louvers so as to provide additional stability when said flap means is positioned at said first one of said louvers corresponding to a minimum selectable angle of tilt.

25. The assembly of claim 23 wherein said series of louvers are equally spaced from each other so as to provide a corresponding number of viewing angle positions of the same increment within said range.

26. The assembly of claim 25 wherein said number is five and said range corresponds to at least 17.5 degrees.

27. The assembly of claim 23 wherein said width of said series of louvers is selected to reduce friction and wear of said base plate means for ease of adjustment and alignment.

28. The assembly of claim 27 wherein each of series of louvers are closed at each end so as to ensure freedom of movement of said flap means during adjustment.

29. In combination, a CRT display terminal unit having a base housing with front and rear edges, said housing including at least a pair of screws located at the corners at said rear edge of said base housing and a tilt base assembly attachable to said base housing to provide a wide range of operator viewing angles for said CRT display terminal unit, said assembly comprising:
a base plate having front and rear edges conforming to said base housing, said base plate including a series of equally spaced stops corresponding to a series of louvers, each of said louver having a front to rear slope, centrally located on said base plate for providing said wide range of viewing angles; and,
a top plate having a shape which conforms to said base housing and is pivotally mounted to said base plate at a predetermined position away from said front edge of said base plate for stabilizing said terminal unit, said plate including:
a pair of open ended slots, one at each corner of the rear of said top plate for mounting on to said base housing of said terminal unit by said pair of screws; and,
a stabilizing flap having top and bottom edges forming a rudder-like shape and having one end pivotally mounted near said rear edge of said top plate so that the other end falls free under the force of gravity during the forward rotation of said terminal unit, said series of sloped louvers enabling said other end to be rearwardly slid into a secure position by sliding said flap into any one of said series of equally spaced stops for a desired viewing angle of tilt.

30. The assembly of claim 29 wherein said rudder-like shape of said flap provides tab portions which extend outward beyond the sides of said top plate for facilitating tilt adjustment.

31. The assembly of claim 29 wherein said assembly further includes:
a first continuous hinge member having a pair of flanges, one flange being attached to the bottom of said top plate near said front edge and the other flange being attached to the top of said base plate at said predetermined position for enabling said top plate to pivot; and
a second continuous hinge member having a pair of flanges, one flange being attached to said bottom of said top plate near said rear edge and the other flange being attached to inside of said flap near said top edge for enabling said flap means to swing freely when said terminal unit is rotated in a forward direction.

32. The assembly of claim 31 wherein said front and rear edges of said top plate have flanges for concealing said first and second hinge members.

33. The assembly of claim 32 wherein said flange of rear edge of said top plate extends in a downward direction a predetermined distance for establishing a maximum limit of travel of said flap.

34. The assembly of claim 31 wherein said top plate, said base plate and said flap are contructed of cold rolled steel material.

35. The assembly of claim 29 wherein the sides of said top plate means are tapered to conform to said shape of said base housing of said terminal unit.

36. The assembly of claim 35 wherein said top plate includes a pair of substantially rectangular shaped cutout portions for aiding in the convection cooling of said terminal unit.

37. The assembly of claim 29 wherein said series of stops correspond to a series of louvers, each having a predetermined width and height.

38. The assembly of claim 37 wherein said height of a first one of said series of louvers is greater than the height of the remaining ones of said series of louvers so as to provide additional stability when said flap is positioned at said first one of said louvers providing a minimum selectable angle of tilt.

39. The assembly of claim 37 wherein said series of louvers are equally spaced from each other so as to provide a corresponding number of viewing angle positions of the same increment within said range.

40. The assembly of claim 39 wherein said number is five and said range corresponds to at least 17.5 degrees.

41. The assembly of claim 36 wherein said width of said series of louvers is selected to reduce friction and wear of said base plate for ease of adjustment and alignment.

42. The assembly of claim 37 wherein each of said remaining ones of said series of louvers is closed at each end so as to ensure freedom of movement of said flap means during adjustment.

* * * * *